United States Patent
Eiza

(10) Patent No.: US 7,504,938 B2
(45) Date of Patent: Mar. 17, 2009

(54) SECURITY SYSTEM AND MONITORING METHOD USING POWER LINE COMMUNICATION TECHNOLOGY

(75) Inventor: Tsuyoshi Eiza, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 305 days.

(21) Appl. No.: 11/486,677

(22) Filed: Jul. 14, 2006

(65) Prior Publication Data

US 2007/0090969 A1   Apr. 26, 2007

(30) Foreign Application Priority Data

Jul. 15, 2005   (JP)   .............................. 2005-207005

(51) Int. Cl.
- *G08B 1/08* (2006.01)
- *G08B 21/00* (2006.01)
- *H04M 11/04* (2006.01)
- *H04Q 7/00* (2006.01)
- *G01G 23/18* (2006.01)

(52) U.S. Cl. .......................... 340/538; 340/666; 177/45

(58) Field of Classification Search ................ 340/538, 340/538.11–538.17, 666, 541, 545.2, 573.1, 340/573.4, 568.1–572.9; 177/45–49; 200/85 R; 73/760, 763, 855

See application file for complete search history.

(56) References Cited

U.S. PATENT DOCUMENTS

| | | | | |
|---|---|---|---|---|
| 3,838,411 A | * | 9/1974 | Vander Meer | ................ 340/538 |
| 4,347,505 A | * | 8/1982 | Anderson | .................... 340/666 |
| 6,249,223 B1 | * | 6/2001 | Christensen | ................ 340/540 |
| 6,515,586 B1 | | 2/2003 | Wymore | |
| 6,822,555 B2 | * | 11/2004 | Mansfield et al. | ...... 340/538.11 |
| 7,129,423 B2 | * | 10/2006 | Baarsch et al. | ........... 177/25.13 |
| 2002/0158775 A1 | | 10/2002 | Wallace | |

FOREIGN PATENT DOCUMENTS

EP   0 529 926   3/1993

(Continued)

OTHER PUBLICATIONS

European Search Report for European application No. 06014866.5-2215, mailed Dec. 4, 2006, 6 pages.
Patent Abstracts of Japan, Publication No. 2003-023678, Publication Date: Jan. 24, 2003, 1 page.

(Continued)

*Primary Examiner*—Benjamin C Lee
*Assistant Examiner*—Jennifer Mehmood
(74) *Attorney, Agent, or Firm*—Osha • Liang LLP

(57) ABSTRACT

A pressure sensor portion includes a plurality of pressure sensors arranged in a plurality of rows and a plurality of columns inside a pressure-sensor-equipped carpet. The pressure sensor portion senses a pressure applied to the surface thereof and outputs a pressure value to a control portion. In an initial learning mode, a storage portion stores, as an initial value, the pressure value output from the pressure sensor portion. In a sensing operation mode, the control portion outputs to a modem portion a data signal indicating that an abnormal event is sensed, when the pressure value output from the pressure sensor portion is larger than the initial value stored in the storage portion by at least a prescribed threshold value. The modem portion superimposes the data signal received from the control portion on a power carrier wave (with a frequency of 50-60 Hz) and outputs the data signal to a power supply plug.

5 Claims, 9 Drawing Sheets

FOREIGN PATENT DOCUMENTS

| | | |
|---|---|---|
| JP | 2002-183845 | 6/2002 |
| JP | 2002-373389 | 12/2002 |
| JP | 2003-23678 | 1/2003 |
| JP | 2003-331371 | 11/2003 |
| WO | WO-99/44180 | 9/1999 |
| WO | WO-2004/054119 | 6/2004 |

OTHER PUBLICATIONS

Patent Abstracts of Japan, Publication No. 2003-331371, Publication Date: Nov. 21, 2003, 1 page.

Patent Abstracts of Japan, Publication No. 2002-373389, Publication Date: Dec. 26, 2002, 1 page.

Patent Abstracts of Japan, Publication No. 2002-183845, Publication Date: Jun. 28, 2002, 1 page.

* cited by examiner

DATA SIGNAL   POWER CARRIER WAVE

| REGISTRATION NUMBER | PRESSURE VALUE |
|---|---|
| 1 | A |
| 2 | B |
| 3 | C |
| ⋮ | ⋮ |

SECURITY SYSTEM AND MONITORING METHOD USING POWER LINE COMMUNICATION TECHNOLOGY

BACKGROUND OF THE INVENTION

1. Field of the Invention

The present invention relates to a security system and a monitoring method, and particularly relates to a security system and a monitoring method that use a power line communication technology utilizing a power line to provide data communication.

2. Description of the Background Art

A Power Line Communication (PLC) technology, which can utilize an existing power line to provide data communication, superimposes a data signal with a high frequency (e.g. 10-450 kHz) on a power carrier wave (50-60 Hz) on a power line of a commercial power supply, to provide data communication. If a frequency band allocated to the data signal is extended to further enhance the speed of data communication, connectivity to the Internet can also be provided by the use of a power line. The use of the power line communication technology has such an advantage as to allow data communication from any room as long as a power receptacle is installed therein, eliminate the need of work for installing new wiring, and thereby achieve high versatility.

In recent years, even in ordinary households, there has been a growing interest in a crime prevention security system. For example, Japanese Patent Laying-Open No. 2003-023678 discloses a monitoring control device capable of easily monitoring the state of a building from a remote site. According to the disclosure, the device is provided with at least one sensor installed in a prescribed place of the building for detecting the internal state of the building, data conversion means for converting an output signal of the sensor into digital data, a personal computer reading the digital data to store the read data, data transmission means for transmitting through the Internet the digital data stored in the personal computer, and a storage server receiving the digital data transmitted by the data transmission means to store the digital data as security information.

However, it is necessary to connect the personal computer installed inside the building to the Internet, resulting in low versatility. Therefore, there have been proposed some security systems that use a power line communication technology and achieve high versatility.

For example, Japanese Patent Laying-Open No. 2003-331371 discloses a self-security system that implements unattended reception in the case of an unexpected visitor, and establishes security while all the people are away, in a state of absence of the people. According to the disclosure above, the system is provided with security monitoring means for receiving through a power line network an ID specific to a sensor and obtained from the sensor, the sensor being attached to a place that requires security, and self-security service provider means for grasping the state based on the correspondence between the sensor-specific ID registered in advance and the place where the sensor is attached, and providing the grasped state to a cellular telephone terminal through electrical mail transmission.

Japanese Patent Laying-Open No. 2002-373389 discloses a security system that is capable of operating itself when an abnormal event occurs, eliminates the need of work for installing a private line, and enjoys high degree of flexibility in installation. According to the disclosure above, the security system uses a power line as communication media to distribute monitored information such as video information or audio information from a transmission device to a receiving device, so as to monitor the presence or absence of an abnormal state. In this system, an abnormal event sensing portion, which is formed of a temperature sensor portion, an audio sensor portion or others, senses whether or not an abnormal event occurs in surroundings.

Japanese Patent Laying-Open No. 2002-183845 discloses a high-functionality crime prevention device that has a crime prevention function and an evidence acquisition function with a simple configuration, and is suitable for being used in an ordinary private house, a small-sized office and others. According to the disclosure above, the system senses an illegal intruder recorded by a home video recorder, causes an alarm to generate an alert, and sends a notification of illegal intrusion to a terminal on a remote center side through a public network.

There has conventionally been proposed a security system that uses a power line communication technology and has high versatility, and hence there is demanded an implementation of a crime prevention security system that is less likely to be noticed by an intruder and has high versatility.

SUMMARY OF THE INVENTION

Accordingly, a main object of the present invention is to provide a security system and a monitoring method that are less likely to be noticed by an intruder and have high versatility.

To summarize, the present invention is a security system using a power line communication technology utilizing a power line to provide data communication. The security system includes: a pressure sensor portion including a plurality of pressure sensors arranged in a plurality of rows and a plurality of columns, and sensing a pressure applied to a surface thereof; a storage portion storing an initial value of a pressure value output from the pressure sensor portion; a control portion comparing the initial value stored in the storage portion with a pressure value output from the pressure sensor portion, and when the pressure value output from the pressure sensor portion is larger than the initial value by at least a prescribed threshold value, outputting a data signal indicating an abnormal event is sensed; and a modem portion superimposing the data signal on a power carrier wave on the power line, and notifying a prescribed destination that the abnormal event is sensed.

According to another aspect of the present invention, the present invention is a security system using a power line communication technology utilizing a power line to provide data communication. The security system includes: a pressure sensor portion sensing a pressure applied to a surface thereof; a control portion outputting a data signal indicating that an abnormal event is sensed when a pressure value output from the pressure sensor portion is not smaller than a prescribed value; and a modem portion superimposing the data signal on a power carrier wave on the power line, and notifying a prescribed destination that the abnormal event is sensed.

Preferably, the pressure sensor portion includes a plurality of pressure sensors arranged in a plurality of rows and a plurality of columns.

Preferably, the security system further includes a storage portion storing an initial value of the pressure value output from the pressure sensor portion. The control portion compares the initial value stored in the storage portion with a pressure value output from the pressure sensor portion, and outputs a data signal indicating that the abnormal event is sensed when the pressure value output from the pressure sensor portion is larger than the initial value by at least a prescribed threshold value.

Preferably, the pressure sensor portion includes a plurality of pressure sensors arranged in a plurality of rows and a plurality of columns.

According to still another aspect of the present invention, the present invention is a monitoring method using a power line communication technology utilizing a power line to provide data communication. The method includes the steps of: storing an initial value of a pressure value output from a pressure sensor portion sensing a pressure applied to a surface thereof; comparing the initial value stored with a pressure value output from the pressure sensor portion, and when the pressure value output from the pressure sensor portion is larger than the initial value by at least a prescribed threshold value, generating a data signal indicating that an abnormal event is sensed; and superimposing the data signal on a power carrier wave on the power line and notifying a prescribed destination that the abnormal event is sensed.

As such, according to the present invention, when the pressure value output from the pressure sensor portion fluctuates, the prescribed party is notified that the abnormal event is sensed. The pressure sensor portion for sensing the intrusion of a suspicious person is mounted on a general household electrical appliance such as a carpet, and hence is less likely to be noticed by the intruder. Furthermore, by using a power line communication technology, it is possible to implement a security system and a monitoring method that have high versatility.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
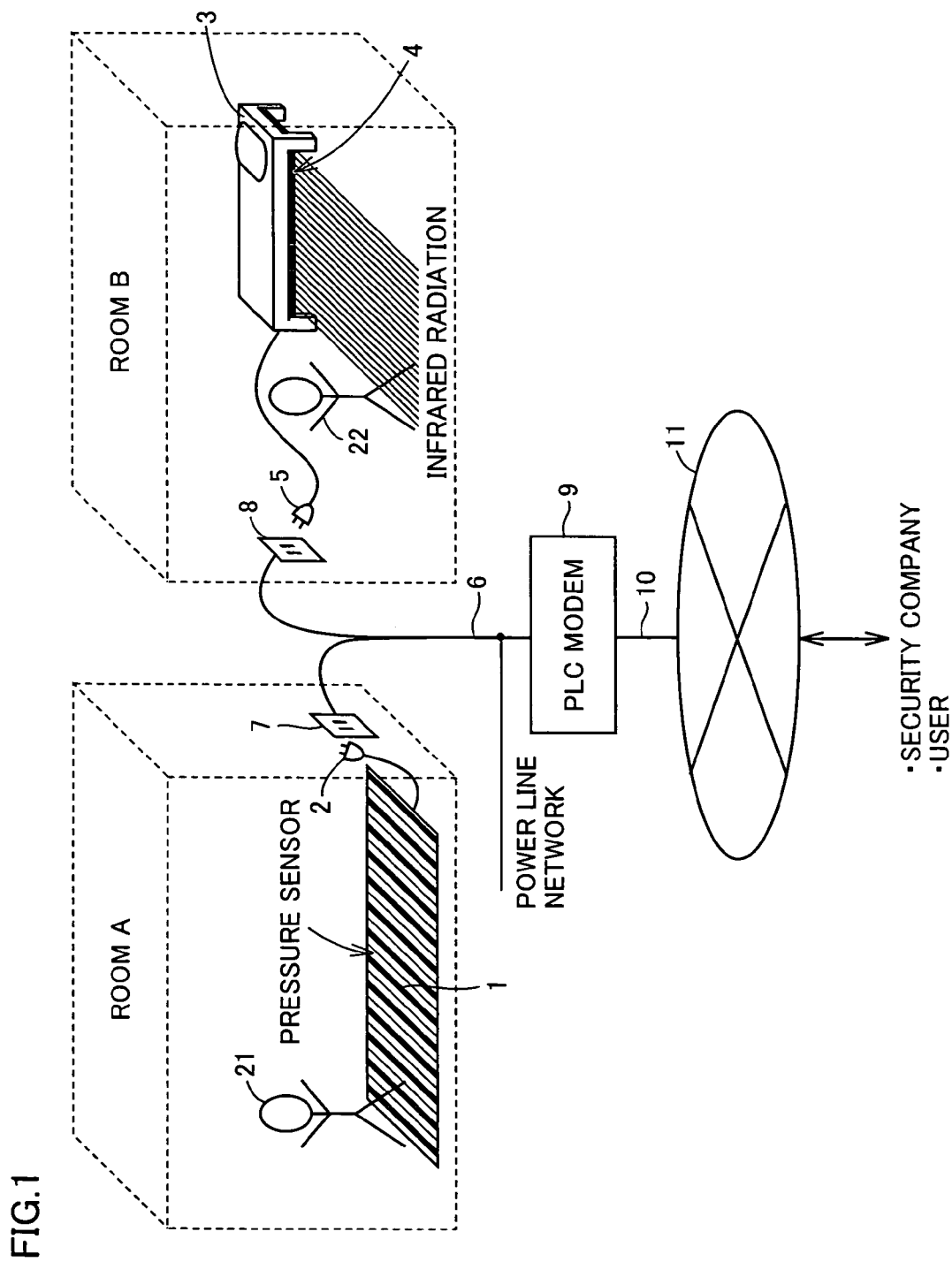
FIG. 1 is a block diagram showing a schematic configuration of a security system according to a first embodiment of the present invention.

The embodiments of the present invention will hereinafter be described with reference to the drawings. The same or corresponding portions in the drawings are denoted by the same reference characters, and the description thereof will not be repeated.

First Embodiment

FIG. 1 is a block diagram showing a schematic configuration of a security system according to a first embodiment of the present invention. In FIG. 1, the security system includes a pressure-sensor-equipped carpet 1, a power supply plug 2 connected to pressure-sensor-equipped carpet 1, a bed 3, an infrared radiation sensor 4 installed at a lower portion of bed 3, a power supply plug 5 connected to infrared radiation sensor 4, a power line 6 connected to a power line network, receptacles 7, 8 connected to power line 6, and a PLC modem 9 connected to power line 6. PLC modem 9 is connected to a communication network 11 through a communication cable 10.

Pressure-sensor-equipped carpet 1, power supply plug 2, and receptacle 7 are installed in a room A. Bed 3, infrared radiation sensor 4, power supply plug 5, and receptacle 8 are installed in a room B. Power line 6 is an electricity distribution line for supplying power to each of the rooms. In the power line communication, power line 6 is used as a communication path. PLC modem 9 is installed in an electric room in collective housing, on an outdoor power pole, or the like. Although not shown, PLC modem 9 may be installed inside the room.

The security system has a configuration in which a notification is sent to a security company and a user through power line 6, PLC modem 9, communication cable 10, and communication network 11 when a suspicious person 21 intrudes into room A or a suspicious person 22 intrudes into room B.

Figure 2:
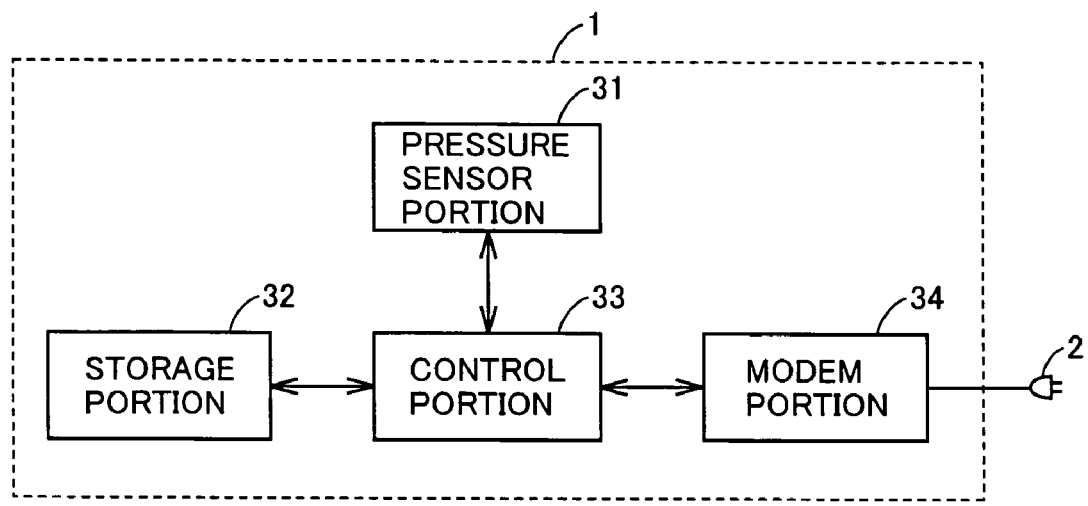
FIG. 2 is a block diagram showing an internal configuration of a pressure-sensor equipped carpet shown in FIG. 1.

FIG. 2 is a block diagram showing an internal configuration of pressure-sensor-equipped carpet 1 shown in FIG. 1. In FIG. 2, pressure-sensor equipped carpet 1 includes a pressure sensor portion 31, a storage portion 32, a control portion 33, and a modem portion 34. Pressure-sensor-equipped carpet 1 has an initial learning mode for storing an initial value of a pressure applied to a surface of pressure sensor portion 31, and a sensing operation mode for sensing fluctuations of the pressure applied to the surface of pressure sensor portion 31.

Figure 5:
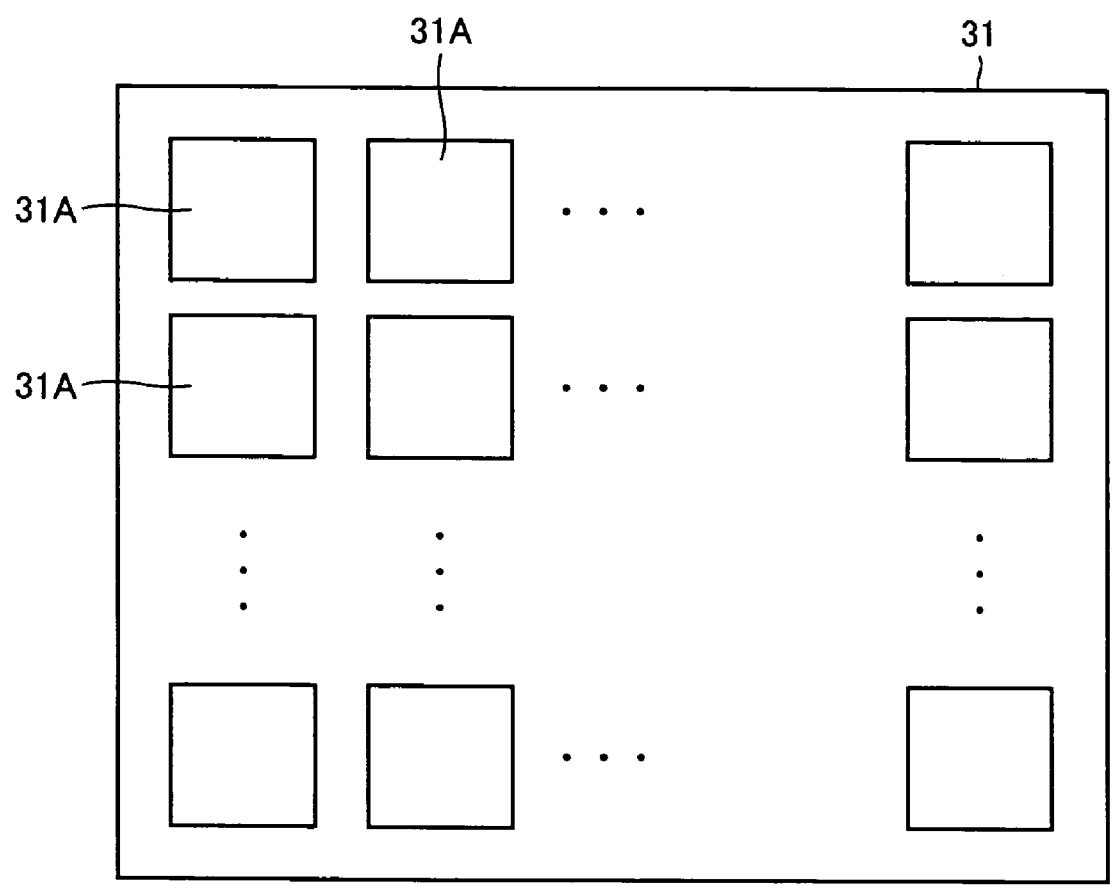
FIG. 5 is a drawing for describing a configuration of a pressure sensor portion 31 shown in FIG. 2.

As shown in FIG. 5, pressure sensor portion 31 includes a plurality of pressure sensors 31A arranged in a plurality of rows and a plurality of columns inside pressure-sensor-equipped carpet 1. Pressure sensor portion 31 senses a pressure applied to the surface thereof and outputs a pressure value to control portion 33.

In the initial learning mode, storage portion 32 receives through control portion 33 a pressure value output from pressure sensor portion 31, and stores the pressure value as an initial value. Accordingly, a pressure value resulting from furniture or others placed on pressure-sensor-equipped carpet 1 is stored as an initial value.

In the sensing operation mode, control portion 33 reads the initial value stored in storage portion 32 and compares the initial value with the pressure value output from pressure sensor portion 31. If the pressure value output from pressure sensor portion 31 is larger than the initial value by a prescribed threshold value, control portion 33 outputs to modem portion 34 a data signal indicating that an abnormal event is sensed. The data signal includes information (e.g. a mail address) about parties to be notified such as a user and a security company, ID information specific to pressure sensor portion 31, and other information. The information about parties to be notified such as a user and a security company, and the ID information specific to pressure sensor portion 31 are stored in storage portion 32 in advance, and read by control portion 33 from storage portion 32.

The threshold value of the pressure with which control portion 33 determines that an abnormal event is sensed can be set arbitrarily. Accordingly, if an indoor pet having a body weight smaller than the threshold value intrudes into room A, control portion 33 can prevent itself from determining that an abnormal event is sensed, and if suspicious person 21 having a body weight larger than the threshold value intrudes into room A, control portion 33 can determine that an abnormal event is sensed.

Modem portion 34 superimposes the data signal received from control portion 33 on a power carrier wave (with a frequency of 50-60 Hz) and outputs the data signal superimposed on the power carrier wave to power supply plug 2. Modem portion 34 has a function of providing a notification that an abnormal event is sensed to a cellular telephone of the user and a personal computer of the security company through electronic mail transmission. However, a method of notification is not limited to the electronic mail, and an audible alert may be generated.

The user can remotely operates pressure sensor portion 31 from a cellular telephone or others. The user sends a data signal commanding on/off control of pressure sensor portion 31. Modem portion 34 separates the data signal from a power carrier wave received through power supply plug 2 and supplies the data signal to control portion 33. Control portion 33 responds to the data signal received from modem portion 34 and provides on/off control to pressure sensor 31.

Figure 3:
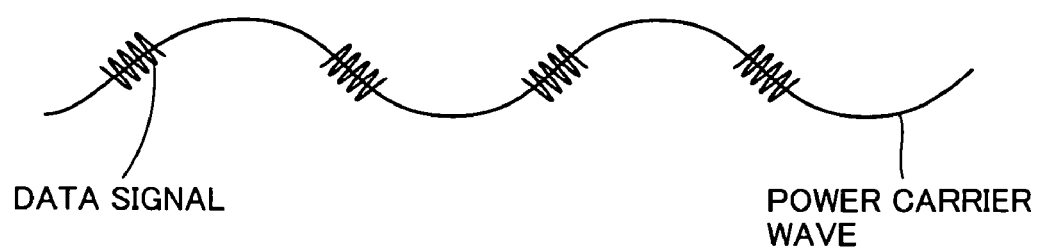
FIG. 3 shows a data signal superimposed on a power carrier wave.

FIG. 3 shows a data signal superimposed on a power carrier wave. As shown in FIG. 3, a data signal with a high frequency (e.g. 10-450 kHz) is superimposed on a power carrier wave with a frequency of 50-60 Hz.

Figure 4:
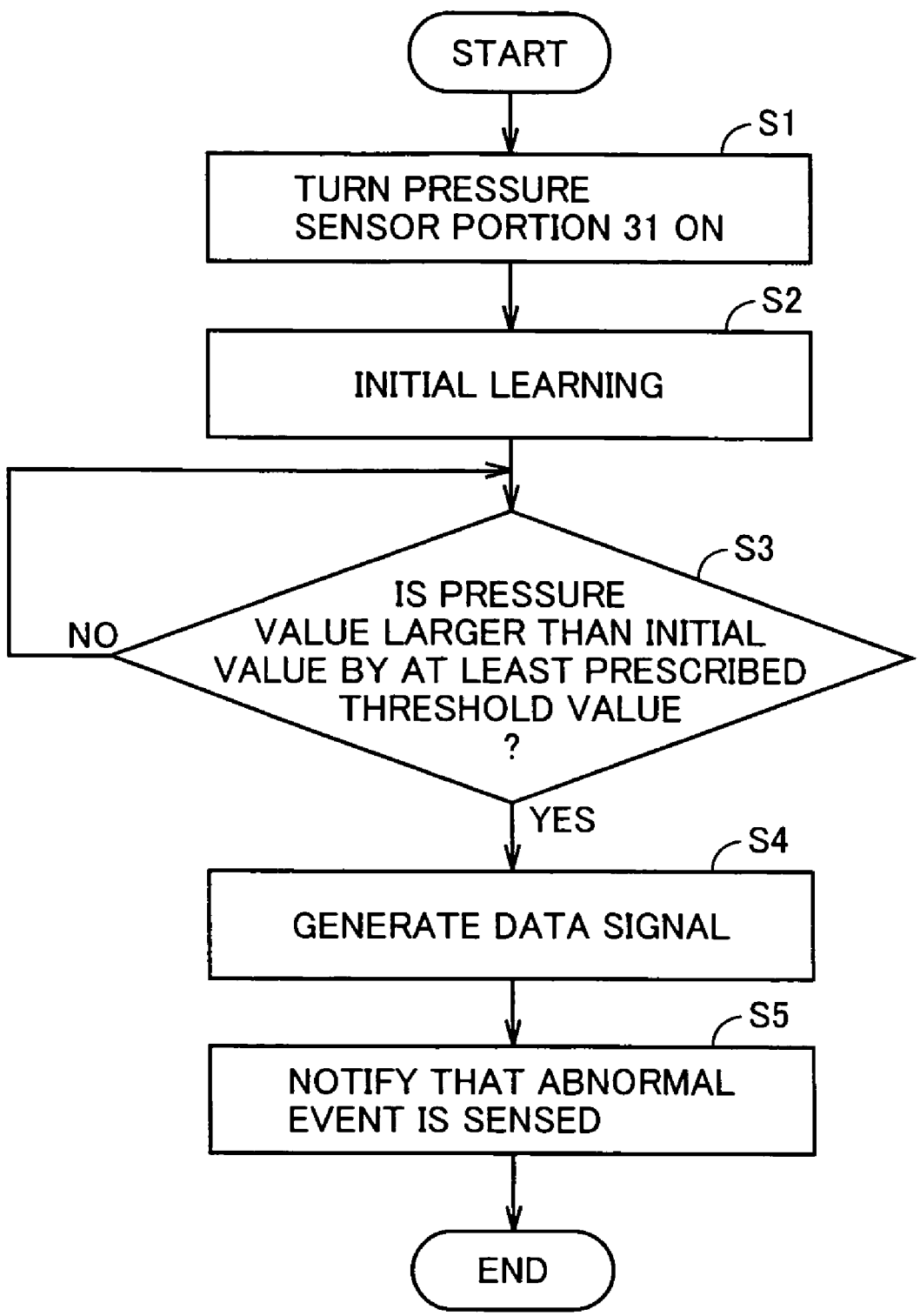
FIG. 4 is a flowchart showing an operation of the pressure-sensor-equipped carpet shown in FIG. 2.

FIG. 4 is a flowchart showing an operation of pressure-sensor-equipped carpet 1 shown in FIG. 2. Referring to FIG. 4, in step S1, control portion 33 turns pressure sensor portion 31 on in accordance with a command from the user. In step S2, control portion 33 performs an initial learning operation in which an initial value of the pressure applied to the surface of pressure sensor portion 31 is stored in storage portion 32 (an initial learning mode).

When the initial learning mode is completed, the operation mode of control portion 33 proceeds to a sensing operation mode. In step S3, control portion 33 reads the initial value stored in storage portion 32 and compares the initial value with a pressure value output from pressure sensor portion 31. If the pressure value output from pressure sensor portion 31 is larger than the initial value by at least a prescribed threshold value, control portion 33 determines that an abnormal event is sensed. In this case, the process proceeds to step S4.

In step S4, control portion 33 generates a data signal indicating that an abnormal event is sensed, and outputs the data signal to modem portion 34. In step S5, modem portion 34 notifies the security company and the user through power line 6 that an abnormal event is sensed.

Referring again to FIG. 1, PLC modem 9 extracts the data signal from the power carrier wave received through power line 6, and provides the data signal to communication network 11 through communication cable 10 (e.g. an optical fiber). Accordingly, a notification that a suspicious person has intruded is sent to the personal computer in the security company and the cellular telephone of the user. By registering a home address and ID information specific to pressure sensor portion 31 when signing a contract with the security company, it is possible to request the dispatch of a security guard in the case of the intrusion of a suspicious person. The notification is sent to the user's cellular telephone, and thereby the user can recognize, away from home, that a suspicious person has intruded. Even in the case of moving, the contract can easily be modified only by correcting the address registered with the security company.

In room B, infrared radiation sensor 4 is installed in a place where an intruder is less likely to notice, for example, at a lower portion of bed 3. Infrared radiation sensor 4 may be integrated with an electric light or others. Infrared radiation sensor 4 radiates an infrared beam linear or planar (a linear beam in the drawing) to a prescribed area. The configuration of infrared radiation sensor 4 is similar to that of pressure-sensor-equipped carpet 1 shown in FIG. 2. If an intruder crosses the infrared beam, infrared radiation sensor 4 senses the intrusion of a suspicious person. In this case, the security company and the user are also notified that a suspicious person has intruded, as in the case where pressure-sensor-equipped carpet 1 senses an abnormal event.

As described above, in the first embodiment, a sensor for sensing the intrusion of a suspicious person is mounted on a general household electrical appliance such as a carpet or an electric light, and hence is less likely to be noticed by the intruder. Furthermore, by using a power line communication technology, it is possible to implement a security system and a monitoring method that have high versatility.

Second Embodiment

Figure 6:
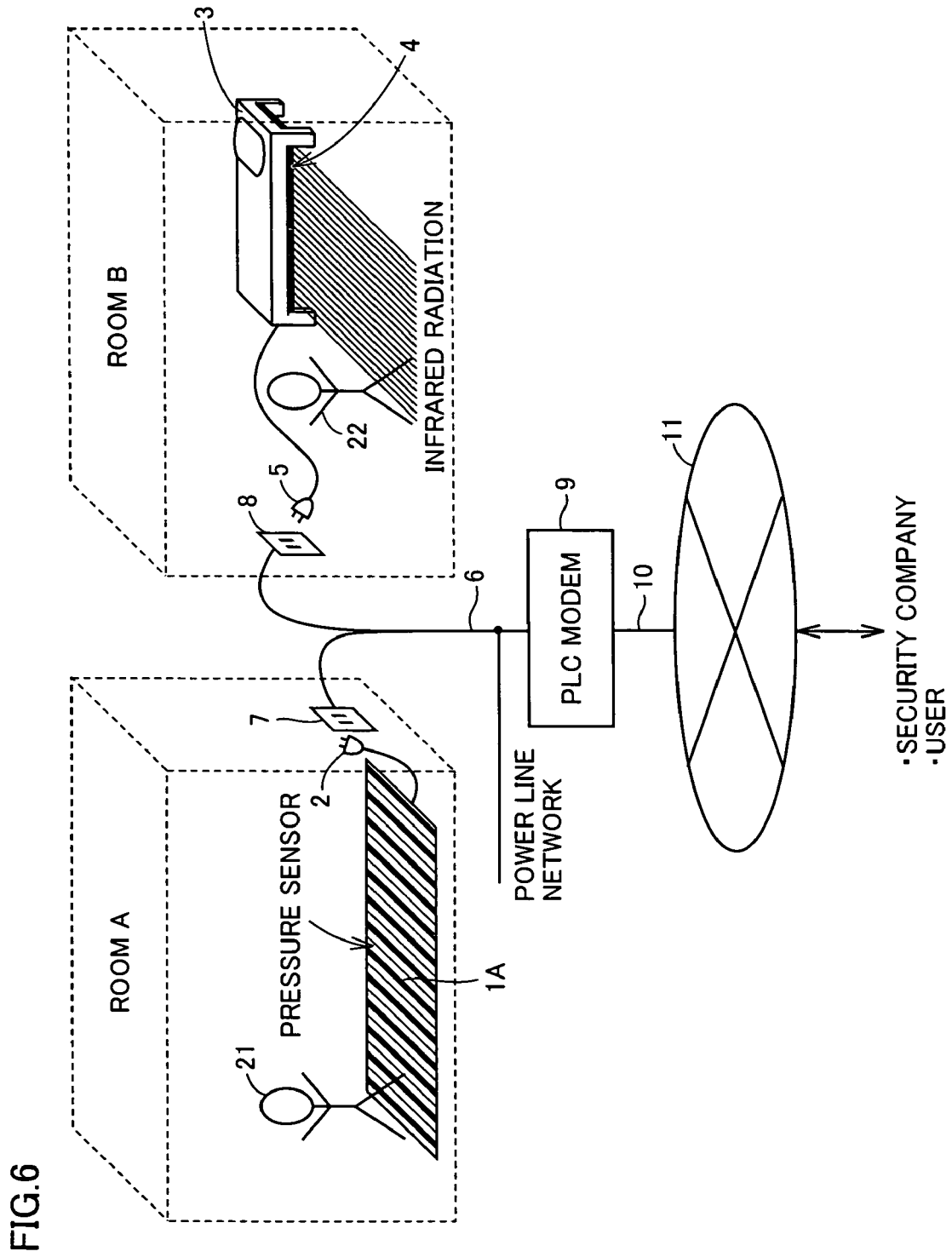
FIG. 6 is a block diagram showing a schematic configuration of a security system according to a second embodiment of the present invention.

FIG. 6 is a block diagram showing a schematic configuration of a security system according to a second embodiment. Referring to FIGS. 6 and 1, the security system according to the second embodiment uses a pressure-sensor-equipped carpet 1A instead of pressure-sensor-equipped carpet 1. On this point, the configuration of the security system according to the first embodiment is different from that of the security system according to the second embodiment. Other portions of the security system shown in FIG. 6 are similar to corresponding portions of the security system shown in FIG. 1, and hence the description thereof will not be repeated.

A single pressure value or a plurality of pressure values is/are registered with pressure-sensor-equipped carpet 1A in advance. Pressure-sensor equipped carpet 1A outputs a data signal indicating that an abnormal event is sensed if a value of the pressure actually applied to the surface thereof does not fall within a prescribed range.

For example, a pressure value obtained when each of the family members steps on pressure-sensor-equipped carpet 1A is registered with pressure-sensor-equipped carpet 1A. If suspicious person 21 steps on pressure-sensor equipped carpet 1A, a pressure value significantly different from the registered value is produced, and hence pressure-sensor-equipped carpet 1A outputs a data signal. In contrast, if any one of the family members steps on pressure-sensor-equipped carpet 1A, no data signal is output from pressure-sensor-equipped carpet 1A. As such, according to the second embodiment, it is therefore possible to prevent erroneous sensing of an abnormal event if any one of the family members steps on pressure-sensor-equipped carpet 1A.

Figures 7, 8:
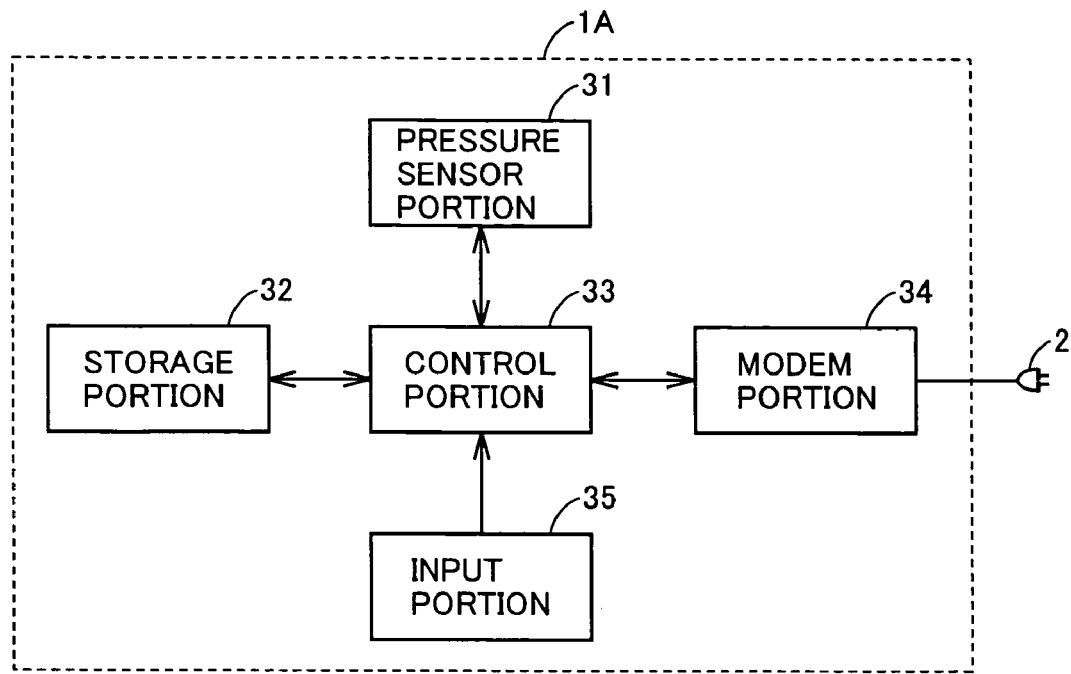
FIG. 7 is a block diagram showing an internal configuration of a pressure-sensor-equipped carpet 1A in FIG. 6.
FIG. 8 shows a form of data stored in a storage portion 32.

FIG. 7 is a block diagram showing an internal configuration of pressure-sensor-equipped carpet 1A in FIG. 6. Referring to FIGS. 7 and 2, pressure-sensor-equipped carpet 1A is different from pressure-sensor equipped carpet 1 in that pressure-sensor-equipped carpet 1A further includes an input portion 35. Other blocks of pressure-sensor-equipped carpet 1A are similar to corresponding portions of pressure-sensor-equipped carpet 1, and hence the description thereof will not be repeated.

When a pressure value is registered, input portion 35 receives from a user (e.g. each of the family members) a registration number and a value of the user's body weight. Control portion 33 receives the registration number and the body weight value from input portion 35, and writes these data to storage portion 32. A pressure value output from pressure sensor portion 31 when the user steps on pressure-sensor-equipped carpet 1A may be written to storage portion 32. In this case, a pressure value more accurate than in the case where the user inputs his/her body weight value is stored in storage portion 32.

FIG. 8 is a drawing that shows the form of data stored in storage portion 32. Referring to FIG. 8, pressure values are stored to correspond to registration numbers, respectively. Pressure values A, B, C correspond to registration numbers 1, 2, 3, respectively.

Figure 9:
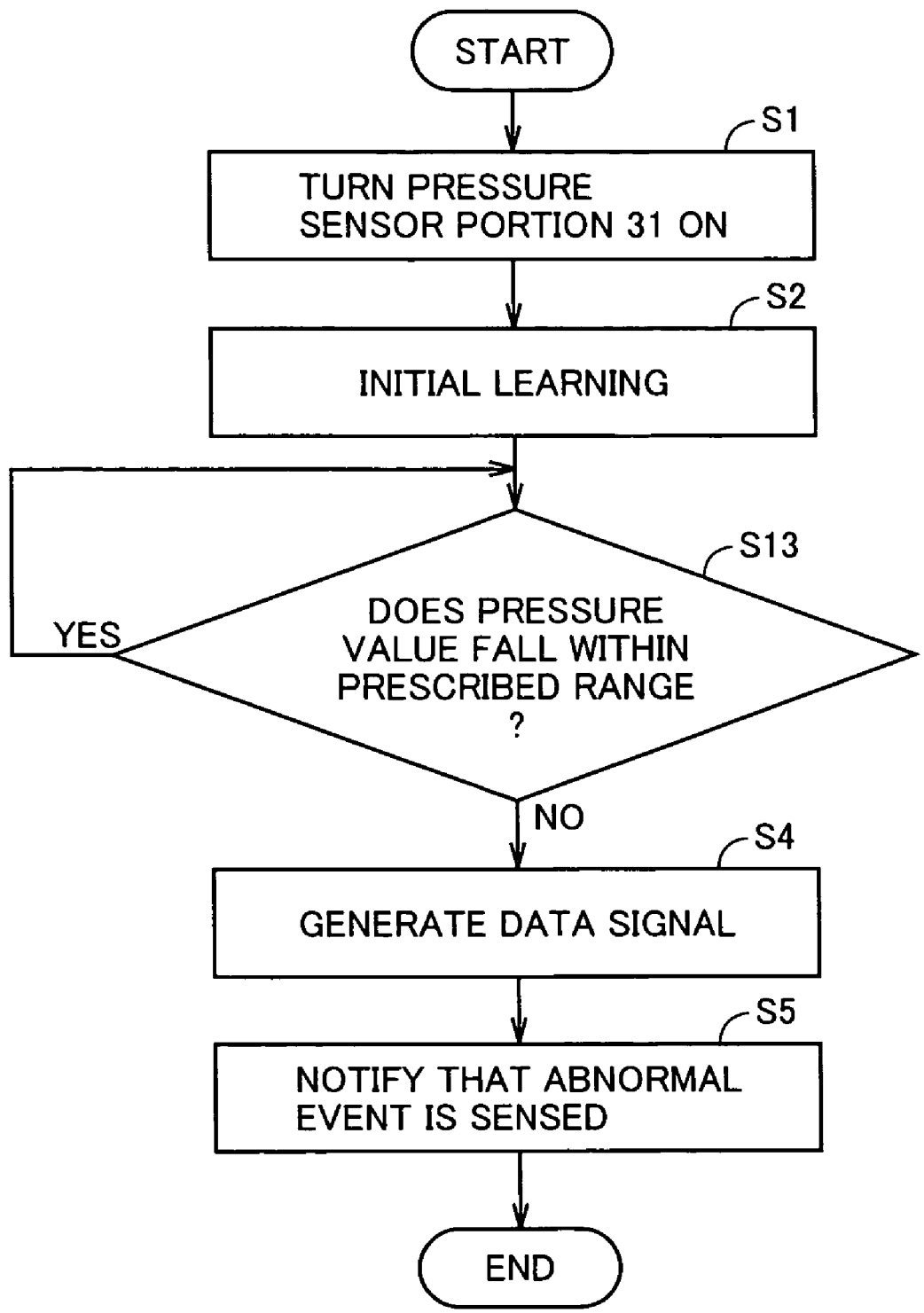
FIG. 9 is a flowchart showing an operation of pressure-sensor-equipped carpet 1A shown in FIG. 7.

FIG. 9 is a flowchart showing an operation of pressure-sensor-equipped carpet 1A shown in FIG. 7. Referring to FIGS. 9 and 4, an operation of pressure-sensor-equipped carpet 1A is different from that of pressure-sensor-equipped carpet 1 in that a process in step S13 is performed instead of the process in step S3. Processes in other steps in the flowchart of FIG. 9 are similar to those in corresponding steps in the flowchart shown in FIG. 4. Therefore, the process in step S13 will now be described, and the description of the processes in other steps in the flowchart of FIG. 9 will not be repeated.

Referring to FIGS. 9 and 7, in step S13, control portion 33 determines whether or not a pressure value output from pressure sensor portion 31 falls within a prescribed range. The "prescribed range" here means a certain width (e.g. ±10%), the center of which corresponds to each of the pressure values registered with storage portion 32. As to the example in FIG. 8, control portion 33 obtains a pressure value A from storage portion 32, and determines whether or not a pressure value output from pressure sensor portion 31 falls within a range of 0.9A-1.1A. If the pressure value is out of the above-described range, control portion 33 obtains a pressure value B from storage portion 32, and performs a similar determination process.

The human body weight fluctuates owing to dining, bathing and others, and hence, even if any one of the family members steps on pressure-sensor-equipped carpet 1A, a pressure value detected at pressure sensor portion 31 deviates from the value stored in storage portion 32 in most cases. In order to prevent erroneous determination that a suspicious person steps on pressure-sensor-equipped carpet 1A, a determination in step S13 is made based on whether or not a pressure value falls within a prescribed range.

In step S13, if the pressure value is out of the prescribed range (NO), control portion 33 determines that an abnormal event occurs. In this case, the process proceeds to step S4. In contrast, if the pressure value falls within the prescribed range (YES), the process returns to step S13.

There is a high probability that the body weight of a suspicious person differs from the body weight of any one of the family members. Accordingly, in the process in step S13, there is a high probability that a pressure value is out of the prescribed range. In contrast, if any one of the family members steps on pressure-sensor-equipped carpet 1A, a pressure value falls within the prescribed range. As such, according to the second embodiment, erroneous sensing of an abnormal event can be prevented even if any one of the family members steps on pressure-sensor-equipped carpet 1A.

Third Embodiment

Figure 10:
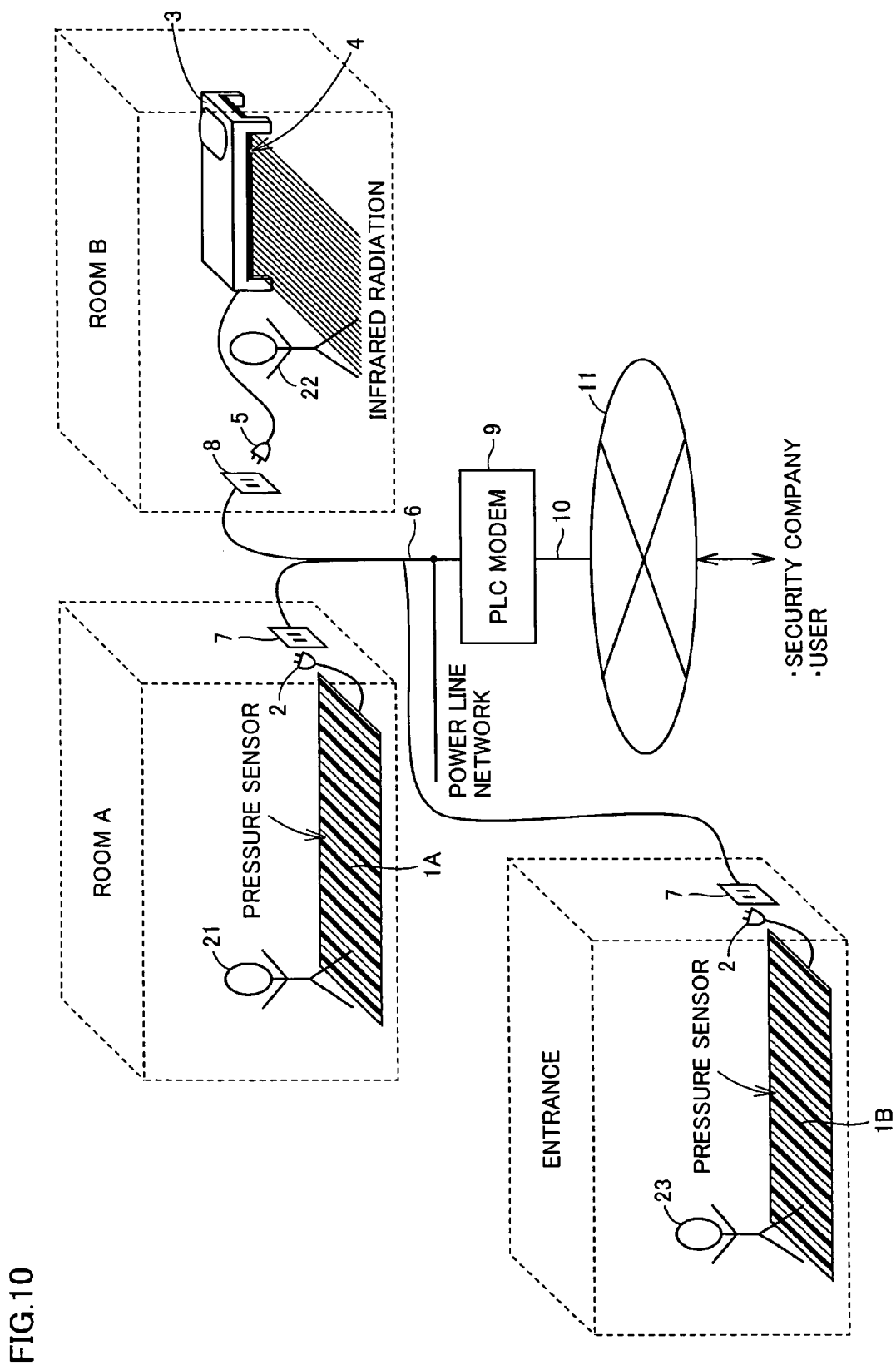
FIG. 10 is a block diagram showing a schematic configuration of a security system according to a third embodiment of the present invention.

FIG. 10 is a block diagram showing a schematic configuration of a security system according to a third embodiment. Referring to FIGS. 10 and 6, a pressure-sensor-equipped carpet 1B is provided at an entrance in the security system according to the third embodiment. On this point, a configuration of the security system according to the second embodiment is different from that according to the third embodiment. Other portions of the security system shown in FIG. 10 are similar to corresponding portions of the security system shown in FIG. 6, and hence the description thereof will not be repeated.

Furthermore, the internal configuration of pressure-sensor-equipped carpet 1B shown in FIG. 10 is similar to that of pressure-sensor-equipped carpet 1A shown in the block diagram of FIG. 7, and hence the description thereof will not be repeated.

In the case of the security system according to the second embodiment, there is a probability that an abnormal event is also sensed if a visitor steps on pressure-sensor-equipped carpets 1A, 1B. In the third embodiment, whether a suspicious person has intruded or not is determined based on a moving route of a person other than the family members.

For example, a visitor enters a house through the entrance. However, there is a low probability that suspicious person 21 intrudes into the house through the entrance. In the third embodiment, a moving route of a person other than the family members is specified, and if the route is different from a route usually expected, an abnormal event is sensed. It is therefore possible to prevent erroneous sensing of an abnormal event when any of the family members or a visitor moves through the house.

Figure 11:
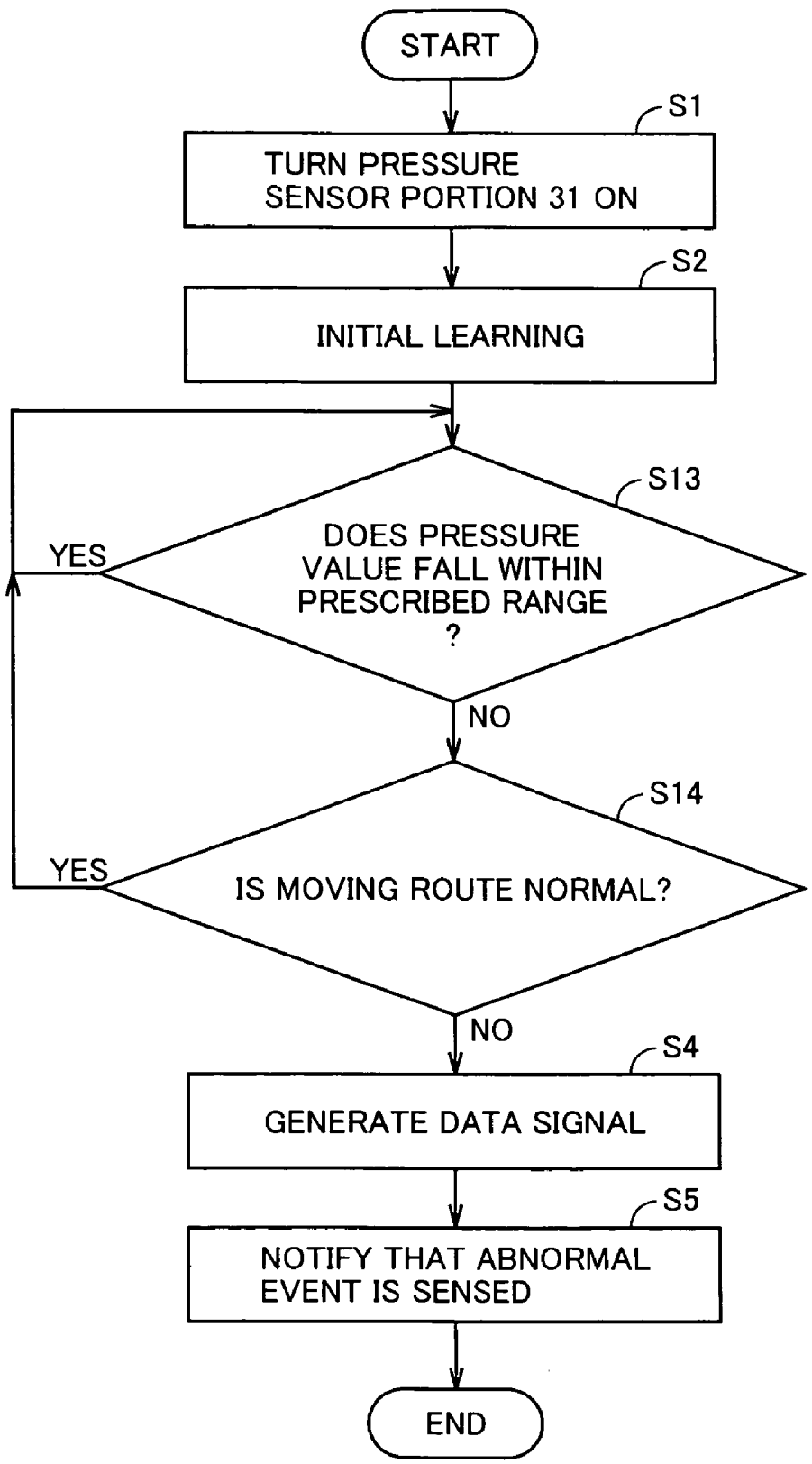
FIG. 11 is a flowchart showing an operation of a pressure-sensor-equipped carpet 1A shown in FIG. 10.

FIG. 11 is a flowchart showing an operation of pressure-sensor-equipped carpet 1A shown in FIG. 10. Referring to FIGS. 11 and 9, an operation of pressure-sensor-equipped carpet 1A shown in FIG. 10 is different from an operation of pressure-sensor-equipped carpet 1A shown in FIG. 6 in that a process in step S14 is added between the process in step S13 and the process in step S4. The processes in other steps in the flowchart of FIG. 11 are similar to those in corresponding steps in the flowchart shown in FIG. 9. Therefore, the process in step S14 will now be described, and the description of the processes in other steps in the flowchart of FIG. 11 will not be repeated.

If a person other than the family members steps on pressure-sensor-equipped carpet 1B, a control portion of pressure-sensor-equipped carpet 1B outputs information indicating that a pressure value different from the stored pressure value is produced, to pressure-sensor-equipped carpet 1A and infrared radiation sensor 4. This information is stored in storage portion 32 of pressure-sensor-equipped carpet 1A. In step S14, control portion 33 confirms whether or not this information is stored in storage portion 32.

If this information is stored in storage portion 32, control portion 33 determines that a moving route of the person other than the family members is normal (YES in step S14). In this case, the process returns to step S13. In contrast, if this information is not stored in storage portion 32, it is indicated that the person directly enters room A. Accordingly, control portion 33 determines that the moving route is abnormal (NO in step S14). In this case, the process proceeds to step S4.

A sensor installed at the entrance is not limited to pressure-sensor-equipped carpet 1B, and may be infrared radiation sensor 4.

As such, according to the third embodiment, it is possible to perform sensing of an abnormal event more precisely by specifying a moving route of a person other than the family members.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A security system using a power line communication technology utilizing a power line to provide data communication, comprising:
    a pressure sensor portion sensing a pressure applied to a surface thereof;
    a storage portion storing at least one initial value of a pressure value output from said pressure sensor portion. wherein each initial value corresponds to a weight on the pressure sensor portion, and is associated with a registration number;
    a control portion outputting a data signal indicating that an abnormal event is sensed when the pressure value output from said pressure sensor portion does not fall within a prescribed range centered on one of the at least one initial value stored in said storage portion; and
    a modem portion superimposing said data signal on a power carrier wave on said power line, and notifying a prescribed destination that the abnormal event is sensed.

2. The security system according to claim 1,
    wherein said storage portion is further adapted to store at least one moving route, and
    wherein said control portion is further adapted to compare said moving route stored in said storage portion With a moving route associated with a pressure value output from said pressure sensor portion, and outputs a data signal indicating that an abnormal event is sensed when the pressure value output from said pressure sensor portion does not fall within a prescribed range centered on one of the at least one initial value stored in said storage portion and the moving route associated with the pressure value output from said pressure sensor portion is different from the moving route stored in said storage portion.

3. The security system according to claim 2, wherein said pressure sensor portion includes a plurality of pressure sensors arranged in a plurality of rows and a plurality of columns.

4. A monitoring method using a power line communication technology utilizing a power line to provide data communication, comprising the steps of:
    storing at least one initial value of a pressure value output from a pressure sensor portion sensing a pressure applied to a surface thereof, wherein each initial value corresponds to a weight on the pressure sensor portion. and is associated with a registration number;
    comparing each of said at least one initial value with a pressure value output from said pressure sensor portion, and when the pressure value output from said pressure sensor portion does not fall within a prescribed range centered on one of the at least one initial value stored in said storage portion, generating a data signal indicating that an abnormal event is sensed; and
    superimposing said data signal on a power cater wave on said power line and notifying a prescribed destination that the abnormal event is sensed.

5. The monitoring method according to claim 4, further comprising the steps of:
    storing at least one moving route;
    comparing the stored moving route with the moving route associated with a pressure value output from said pressure sensor portion; and
    generating a data signal indicating that an abnormal event is sensed when the pressure value output from said pressure sensor portion does not fall within a prescribed range centered on one of the at least one initial value stored in said storage portion and the moving route associated with the pressure value output from said pressure sensor portion is different from the moving route stored in said storage portion.

* * * * *